Patented July 4, 1933

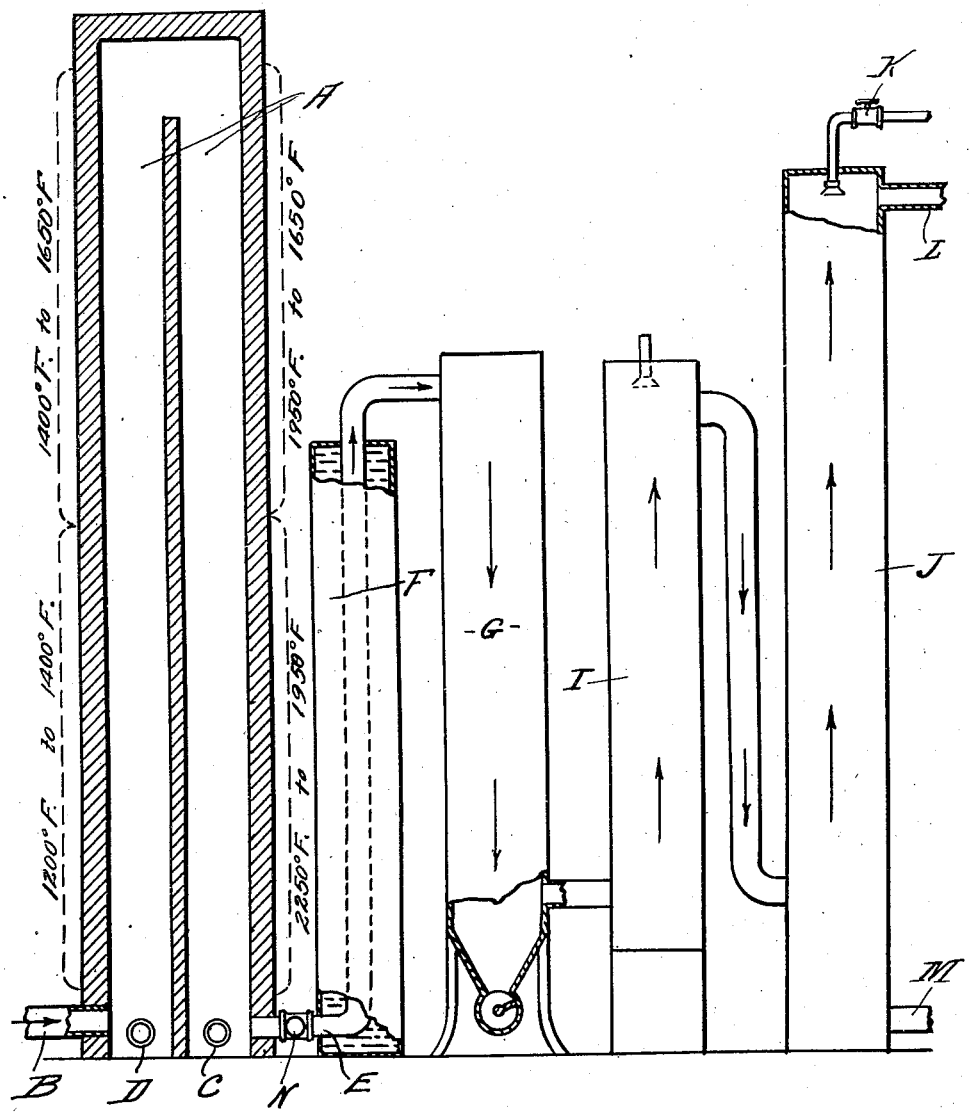

1,916,291

UNITED STATES PATENT OFFICE

WILLIAM D. WILCOX, OF KANSAS CITY, MISSOURI

PROCESS OF OBTAINING CARBON BLACK AND HYDROCARBONS OF MORE COMPLEX MOLECULAR STRUCTURE BY THE PYROLYTIC DISSOCIATION OF HYDROCARBON GASES AND VAPORS

Application filed December 6, 1930. Serial No. 500,582.

Over a long period of years, primary distillation products, chiefly of the methane series, given off in the carbonization of coal, have been cracked by contact with the highly heated walls of the retorts and have polymerized forming vapors of the benzol series, naphthalene, etc. That these products are the result of subjection to high temperature and recombination is well evidenced by their almost entire absence from the products obtained by carbonization at low temperature. Rather recently experiments have been carried out for the most part under laboratory conditions in which methane and its homologues have been subjected to temperatures similar to those which exist along the walls of a coal gas oven for a brief interval and the products of cracking collected. They are found similar to those obtained commercially by scrubbing coal gas. Cracking of gases at somewhat higher temperatures to obtain carbon and/or hydrogen, according to the formula $CH_4$ plus heat equals $C$ plus $2H_2$, has been brought into commercial use. It is the purpose of my process to obtain condensible hydrocarbons together with finely divided carbon. While one combination of operating conditions is most favorable to the production of polymerization products, another more favorable to the evolution of solid carbon, my process embodies conditions of operation and procedure by which both products are obtained in usable form and the value of total product thereby increased.

My process can be more readily understood by reference to the accompanying diagram. A is a vertical conduit of refractory materials preferably built in the form of an inverted U, B is an inlet for the introduction of the hydrocarbon gases which are to be decomposed, E is the outlet for these gases, C is an inlet through which a combustible mixture of gas and air is admitted either to the conduit itself, in which event heat is imparted directly to the interior walls of the conduit by periodic combustion, or to flues within the enclosing walls of the conduit, in which event heating is continuous and the heat which effects dissociation must pass inward through the enclosing walls as in the by-product coke oven, D is the outlet for the combustion gases. Silica is the most suitable material for the lining of the conduit, both by reason of its highly refractory qualities and by reason of the fact that it does not, as do metals, exercise a catalytic effect preferentially promoting the dissociation to carbon and hydrogen.

Dissociation is largely, if not entirely, a matter of surface contact. Efficiency in operation will require a large area of heated surface in proportion to the cross section of conduit. The dissociation chamber will therefore preferably contain a number of small flues, whether heated externally or by periodic blasting. It has been universal practice in the past in the cracking of oil vapors to obtain gas or carbon, to fill the dissociation chamber with checker brick to provide the media of heat absorption and transfer. This I find to be highly disadvantageous so far as the recovery of carbon is concerned. In this arrangement or employing loosely piled refractory material there are horizontal surfaces and spaces outside the direct current of gas upon which the carbon settles, remains, and is consumed in the following blast period. I find that a great increase in the proportion of carbon recovered may be effected by using small vertical flues in place of checker brick. This alone is not adequate. The velocity of the gas must be sufficient to overcome the tendency of carbon to adhere to the walls. Some definite time of exposure to heated surfaces is necessary to effect the results desired. To employ high velocity, without reducing the time of contact, is made possible by extending the length of the conduit heated to a cracking temperature.

In an experimental plant from which excellent results were obtained in the complete recovery of the carbon evolved, the total length of travel of the gas treated was 41 feet, and there is reason to believe that some advantage will result from a further increase.

It will be noted that the combustion gases by which the contacting surfaces are brought to a dissociating temperature are passed through and from the dissociating unit in a direction counter current to the direction of travel through this unit of the gases subjected to dissociation. They fall in temperature during this passage, though giving up a part of their heat to the flue walls so that the temperatures created are progressively less from the point where active combustion takes place to the outlet. It follows from this that the gases subjected to treatment, in counter current flow are progressively in contact with more highly heated surfaces in their passage through the dissociation chamber and are gradually brought to the temperature finally attained. In the drawing I have indicated a probable range of temperature variation. This is illustrative only. The actual range of temperatures will vary with the volume per minute of fuel gas and air introduced, the length of travel as determined by the dimensions of the unit, the rate of travel as determined by velocity, and the length in time of the reheating period.

Where the carbon is recovered by slow deposition or by filtering the gas through cloth bags, the gas is so cooled that a portion of the volatiles condense upon the carbon making necessary its later subjection to a calcining process. For this reason I pass the gas issuing through E, through pipe F surrounded by a water jacket, the amount of cooling water relative to the volume of gas passing being so controlled as to cool the gas to around 900° F. At this temperature the polymerization products remain gaseous. The gas is passed through electrical precipitation unit G. The carbon is recovered free of volatiles and removed from the base of the unit by conveyor H. The gas then passes through secondary cooler I. It may be found advisable to introduce a tar extractor between I and oil scrubber J to remove the heavier and more readily condensible hydrocarbons. In J the gas passes up counter current to oil sprayed from K. The benzol, naphthalene etc. are absorbed by the oil and pass out through M, the stripped gas through L. Benzol is separated from the oil by well known means. The gas may be further treated to obtain carbon and hydrogen, passed through an electric arc with production of carbon, acetylene and hydrogen, or it may be burned so far as necessary to supply the heat required for dissociation. When the gasses treated are rich in ethane, propane and butane the residue gas will contain a large percentage of ethylene usable in the production of many useful chemicals.

My process may be advantageously employed using natural gas, cracking still gases, oil vapors, or a rich coal gas. The best results are obtained within a temperature range of 1800° to 2150° F. When a conduit such as shown is of extended length better results in the proportion of heat absorbed from the heating gas and made useful are obtained, than when the heating gases have only a short distance of travel before discharged. That portion of the conduit farthest from the point where the heating gases enter need not be brought to a dissociation temperature. It may, and preferably will be, employed to preheat the gas prior to its being brought in contact with the surfaces heated to a temperature in excess of 1800° F. Referring to the drawing, it will be seen that the temperature of the conduit is progressively increased from 1200° F. to a maximum temperature of 2250° F. The drawing also shows, diagrammatically, the temperatures of various zones in the conduit, such as 1200° F. to 1400° F., 1400° F. to 1650° F., 1650° F. to 1950° F. and 1950° F. to 2250° F., the temperatures increasing in the direction of the flow of the run gas through the conduit. The optimum temperature of operation in any unit must be determined by operating experience. The higher homologues of methane are dissociated at somewhat lower temperatures, and hence the temperatures employed will be determined in some degree by the composition of the gases treated. Maximum temperatures imparted to the heated contact surfaces will be within the range 1900° to 2200° F., the gas will be somewhat less heated. The time of contact of the gas with the surfaces heated to these temperatures will range from one to three seconds. Shorter time of contact is more favorable to the production of polymerization products, longer to the production of carbon and hydrogen. Longer contact is permissible where the temperatures are relatively low. It is quite well established that continued subjection to high temperatures causes the particles of carbon to sinter together decreasing the average fineness of division and imparting to the product a grayish tint. With high velocity and only a brief time of exposure to heat, the carbon recovered will be of a darker color and more nearly approaching the particle size of channel process black. This fact in some degree offsets the smaller recovery as compared with the results of operation at higher temperatures and with longer time of contact. It is not believed possible to obtain maximum recoveries of polymerized products without the employment of temperatures at which some carbon is made.

What I claim as new and desire to protect by the issuance to me of Letters Patent is—

1. The process of obtaining carbon black and hydrocarbons of more complex molecular structure by the pyrolytic dissociation of hydrocarbon gases and vapors which comprises passing the hydrocarbon gases in contact with the refractory interior surfaces of a conduit which are heated within a maximum range of 1800° to 2200° F., with a time of contact with the surfaces so heated within the range of one to three seconds, cooling the issuing gas to a temperature at which the condensible hydrocarbons remain vaporous, recovering the carbon from the gas, further cooling it and extracting the condensible hydrocarbons therefrom.

2. The process of obtaining carbon black and hydrocarbons of more complex molecular structure by the pyrolytic dissociation of hydrocarbon gases and vapors which comprises heating the interior of a refractory walled conduit by maintaining a periodic combustion therein to a maximum temperature within the range 1800° to 2200° F., and thereafter passing hydrocarbon gases through the conduit in a direction counter current to the travel of the heating gases and contacting them with the surfaces so heated within the range 1800° to 2200° F. for a period of time within the range one to three seconds, and thereafter cooling the gas to a temperature at which the condensible hydrocarbons remain vapors, recovering the carbon, further cooling the gas and absorbing out the condensible components of the gas.

3. The steps in the process of obtaining carbon black and hydrocarbons of more complex molecular structure by the pyrolytic dissociation of hydrocarbon gases and vapors which comprises passing the hydrocarbon gases in contact with the interior surfaces of a conduit heated to a maximum temperature within the range 1800° to 2200° F., giving to the gases a time of contact with the surfaces so heated within the range of one to three seconds.

4. The steps in the process of obtaining carbon black and hydrocarbons of more complex molecular structure by the pyrolytic dissociation of hydrocarbon gases and vapors which comprises heating the refractory interior surfaces of a conduit to a maximum temperature within the range 1800° to 2200° F. by periodically passing hot combustion gases through the conduit, and thereafter passing hydrocarbon gases through the conduit in a direction counter current to the direction of travel of the heating gases, contacting them with the surfaces heated within the range 1800° to 2200° F. for a period of from one to three seconds.

5. The process of obtaining carbon together with benzol and other hydrocarbons of more complex molecular structure by the pyrolytic dissociation of hydrocarbon gases and vapors which comprises passing the gases through a conduit, the interior surfaces of which are heated to a maximum temperature within the range 1800° to 2200° F., contacting them with the surfaces so heated for a period of one to three seconds, cooling the gases to a temperature in excess of that at which the polymerized products condense, removing the carbon, further cooling the gases, absorbing out and recovering the condensible vapors.

6. The process of obtaining carbon black together with benzol and other hydrocarbons of more complex molecular structure by the pyrolytic dissociation of hydrocarbon gases and vapors which comprises heating the interior of a refractory walled conduit by periodically burning combustible gas therein to a maximum temperature within the range 1800° to 2200° F., then passing hydrocarbon gases through the conduit in a direction counter current to the travel of the heating gases at a rate of flow which offsets the tendency of the carbon to adhere to the walls and with a contact of the gases with the more highly heated surfaces of the conduit for a period of one to three seconds, partially cooling the issuing gas, recovering the carbon therefrom, further cooling and absorbing out and recovering the condensible hydrocarbons.

7. The process of obtaining carbon black, benzol and other hydrocarbons of more complex molecular structure by the pyrolytic dissociation of hydrocarbon gases and vapors which comprises heating the interior of a conduit to a maximum temperature within the range 1800° to 2200° F. by means of heat conducted from flues adjacent to the conduit and simultaneously passing hydrocarbon gases and vapors through the conduit at a rate of travel which brings them in contact with the surfaces heated within the range of temperature stated for a period of one to three seconds, withdrawing the heated gases, cooling them to a temperature at which the condensible volatiles remain vapors, removing the carbon formed, further cooling the gases, absorbing out and recovering the condensible components of the gas.

8. The steps in the process of obtaining carbon black, benzol and other hydrocarbons of more complex molecular structure by the pyrolytic dissociation of hydrocarbon gases and vapors which comprises heating the interior surfaces of a conduit by means of heat conducted through the walls of the conduit from an external source to a maximum temperature within the conduit of from 1800° to 2200° F. and simultaneously passing hydrocarbon gases or vapors through the conduit at a rate of travel which brings them in contact with the surfaces heated within the temperatures stated for from one to three seconds.

9. The steps in the process of obtaining carbon black together with benzol and other hydrocarbons of more complex molecular structure by the pyrolytic dissociation of hydrocarbon gases and vapors which comprises passing the hydrocarbon gases through a conduit of refractory materials, the interior surfaces of which are heated to maximum temperatures within the range 1800° to 2200° F., at such a rate of flow as prevents the carbon evolved from adhering to the interior surfaces of the conduit, and which permits a contact of the hydrocarbon gases with the surfaces so heated for an interval within the range of one to three seconds.

10. The steps in the process of obtaining carbon black together with benzol and other hydrocarbons of more complex molecular structure by the dissociation of hydrocarbon gases and vapors which comprises contacting the gases with refractory surfaces heated to a maximum temperature within the range 1800° to 2200° F., during a time interval of from one to three seconds.

11. The steps in the process of obtaining carbon black, benzol and other hydrocarbons of more complex molecular structure by the dissociation of hydrocarbon gases and vapors which comprises heating refractory surfaces to temperatures within the range 1800° to 2200° F., contacting the hydrocarbon gases with these surfaces for a time interval of one to three seconds, and immediately thereafter cooling the gases to a temperature of 900° F.

12. The process of obtaining carbon black, benzol and other hydrocarbons of more complex molecular structure by the dissociation of hydrocarbon gases and vapors which comprises heating refractory surfaces to a temperature within the range 1800° to 2200° F., contacting the hydrocarbon gases with these surfaces for a time interval of one to three seconds, immediately cooling the gases to a temperature of 900° F., extracting the carbon, further cooling the gases and absorbing out and recovering the condensible hydrocarbons.

In witness whereof I have affixed my signature.

WILLIAM D. WILCOX.